(12) United States Patent
Kovac

(10) Patent No.: US 7,387,282 B2
(45) Date of Patent: Jun. 17, 2008

(54) HINGED CLIP HAVING A RETAINER

(75) Inventor: Zdravko J. Kovac, Chesterfield, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/490,278

(22) Filed: Jul. 20, 2006

(65) Prior Publication Data
US 2007/0018057 A1    Jan. 25, 2007

Related U.S. Application Data

(60) Provisional application No. 60/701,116, filed on Jul. 20, 2005.

(51) Int. Cl.
*F16L 3/08* (2006.01)
(52) U.S. Cl. .................. 248/74.4; 248/55; 248/56; 248/65; 248/68.1; 248/71; 248/74.2; 248/74.1; 248/75; 248/73; 248/74.3
(58) Field of Classification Search ............... 248/55, 248/56, 65, 68.1, 71, 74.4, 74.2
See application file for complete search history.

(56) References Cited

U.S. PATENT DOCUMENTS

| | | | | |
|---|---|---|---|---|
| 3,954,238 | A | * | 5/1976 | Nivet .................. 248/68.1 |
| 4,264,047 | A | | 4/1981 | Nelson |
| 4,386,752 | A | | 6/1983 | Pavlak et al. |
| 4,457,482 | A | * | 7/1984 | Kitagawa .................. 248/74.3 |
| 4,478,381 | A | | 10/1984 | Pittion et al. |
| 4,669,156 | A | * | 6/1987 | Guido et al. .................. 24/336 |
| 5,184,794 | A | | 2/1993 | Saito |
| 5,363,539 | A | | 11/1994 | Tisol |
| 5,494,245 | A | | 2/1996 | Suzuki et al. |
| 5,653,411 | A | | 8/1997 | Picco et al. |
| 5,820,048 | A | | 10/1998 | Shereyk et al. |
| 5,984,242 | A | | 11/1999 | Meyer |
| 6,036,145 | A | | 3/2000 | Calabrese et al. |
| 6,053,458 | A | | 4/2000 | Meyer |
| 6,105,218 | A | | 8/2000 | Reekie |
| 6,152,406 | A | | 11/2000 | Denndou |
| 6,211,465 | B1 | * | 4/2001 | Streit .................. 174/653 |
| 6,315,250 | B1 | | 11/2001 | Meyer |
| 6,565,049 | B2 | | 5/2003 | Hahn |
| 6,604,725 | B1 | | 8/2003 | Thullen et al. |
| 6,809,257 | B2 | | 10/2004 | Shibuya |
| 2003/0183733 | A1 | | 10/2003 | Pisczak |
| 2004/0159454 | A1 | * | 8/2004 | Shibuya .................. 174/48 |

(Continued)

FOREIGN PATENT DOCUMENTS

FR     2855844     12/2004

(Continued)

*Primary Examiner*—Brian E. Glessner
*Assistant Examiner*—Nkeisha Dumas
(74) *Attorney, Agent, or Firm*—Harness, Dickey & Pierce, P.L.C.

(57) ABSTRACT

A clip retention system includes first and second body members. A first body member pin is joined by a living hinge to the second body member which permits an angular range of body member rotation. Retention elements partially enclose the pin. Upon living hinge failure the retention elements prevent body member disassociation for any angle within the angular range of rotation.

19 Claims, 7 Drawing Sheets

U.S. PATENT DOCUMENTS

| | | | |
|---|---|---|---|
| 2004/0182973 A1 | 9/2004 | Kawai | |
| 2005/0116122 A1* | 6/2005 | Nakanishi | 248/68.1 |
| 2005/0284989 A1* | 12/2005 | Mizukoshi | 248/65 |

FOREIGN PATENT DOCUMENTS

| | | | |
|---|---|---|---|
| JP | 10259884 | * | 3/1997 |
| JP | 2004360910 | | 12/2004 |

* cited by examiner

HINGED CLIP HAVING A RETAINER

CROSS-REFERENCE TO RELATED APPLICATIONS

This application claims the benefit of U.S. Provisional Application No. 60/701,116, filed on Jul. 20, 2005. The disclosure of the above application is incorporated herein by reference.

FIELD

The present disclosure relates in general to clip fasteners and more specifically to a device and method for creating and using a clip fastener having members joined by a living hinge, the clip fastener used for joining items such as cables or tubing to automobile vehicles.

BACKGROUND

The statements in this section merely provide background information related to the present disclosure and may not constitute prior art.

Clips for attaching elongated articles such as fuel lines, brake fluid lines, wires or wiring harnesses to the body or panels of an automobile vehicle commonly have two major component members which can be joined by a living hinge. A first member normally includes one or more generally U-shaped receiving areas which are adapted to receive one or more of the elongated articles. The second member is further adapted to snap or fixedly connect to the first member, engaging the elongated articles between the first and second members. A living hinge is commonly used to join the two members and allow rotation to close the two members together. One or more male members commonly extend from one of the parts which are operable to engage a body panel of the automobile vehicle.

Several drawbacks are notable for common clip designs. A first drawback is due to the flexibility requirements of the living hinge. The living hinge must be thin enough to allow flexibility for rotation of the second member about the elongated articles during installation of the clip. Manufacturing defects, overextension of the clip before assembly, and/or damage during shipment can occur. This frequently results in failure of the living hinge, in some cases following manufacture of the clip but before the clip is installed or during installation of the clip. Living hinge failure prior to clip installation often results in lost parts or the inability to install the clip, particularly if automated installation equipment is used. Living hinge failure following clip installation can allow the elongated article(s) to displace which can result in further vehicle system or component failure. Any of the above failures can result in increased costs to the manufacturer, the clip installer or to a replacement service to replace the broken clip or failed systems while in service.

Clips having a retention feature to prevent dislocation of the first and second members upon failure of the living hinge during use may include a retainer element. Common retainer elements employ or are functional only when the two clip members are joined or after the two clip members are rotated toward each other beyond a predetermined angle. Some retainer elements are themselves frangible and break when rotation is initiated. Even with these retainer elements, if the living hinge or retainer element fails during clip transfer from the clip manufacturer to the installer, or at the facility of the installer before or during installation, the clip is generally discarded.

SUMMARY

A hinged clip having a retainer according to a preferred embodiment of the present disclosure includes first and second clip portions. A living hinge integrally connecting the first and second clip portions is operable to permit rotation of the first and second clip portions relative to each other throughout an angular range of rotation. A retention device connects the first and second clip portions. Upon failure of the living hinge the retention device is operable to prevent disassociation of the first and second clip portions for any angle within the angular range of rotation and up to a maximum rotation angle.

In another aspect of the disclosure, a clip retention system includes first and second integrally connected body members. A connection joint connects the second body member to the first body member. The connection joint includes a pin integrally connected to the first body member and a living hinge integrally connecting the pin to the second body member. The living hinge permits rotation of the first and second body members relative to each other throughout an angular range of rotation. At least one curved element integrally connected to the second body member partially encloses the pin. Upon failure of the living hinge the curved element prevents separation of the first and second clip members for any angle of rotation within an angular range of rotation and up to a maximum rotation angle.

In a further aspect of the disclosure, the living hinge includes a first end and a second end. A thickness of the living hinge is variable from the first end to the second end.

In a still further aspect of the disclosure, a method is provided for preventing disassociation of a first member of a clip having a pin from a second member of the clip normally joined by a living hinge upon failure of the living hinge, the living hinge operable to provide an angular range of rotation between the first and second members. The method includes integrally connecting the pin to the first body member. The method also includes integrally coupling the pin to the second member with the living hinge. The method further includes molding oppositely directed extension members integrally with the second member operable to at least partially enclose the pin. The method still further includes rotatably engaging the oppositely directed extension members with the pin to operably prevent disassociation of the first and second clip members upon failure of the living hinge for any angle of rotation between the first and second body members within the angular range of rotation.

A hinged clip having a retainer of the present disclosure offers several advantages. The retainer of the present disclosure is functional for any orientation of the first and second clip members. The retainer is therefore functional to provide for engagement of the two clip members even if the living hinge fails during shipment or before installation of the clip as well as after installation. The retainer of the present disclosure also maintains the necessary clamping force between the two clip members and the elongated article(s) if the living hinge fails after the clip is installed. The hinged clip of the present disclosure also accommodates installation tolerances of the elongated articles.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
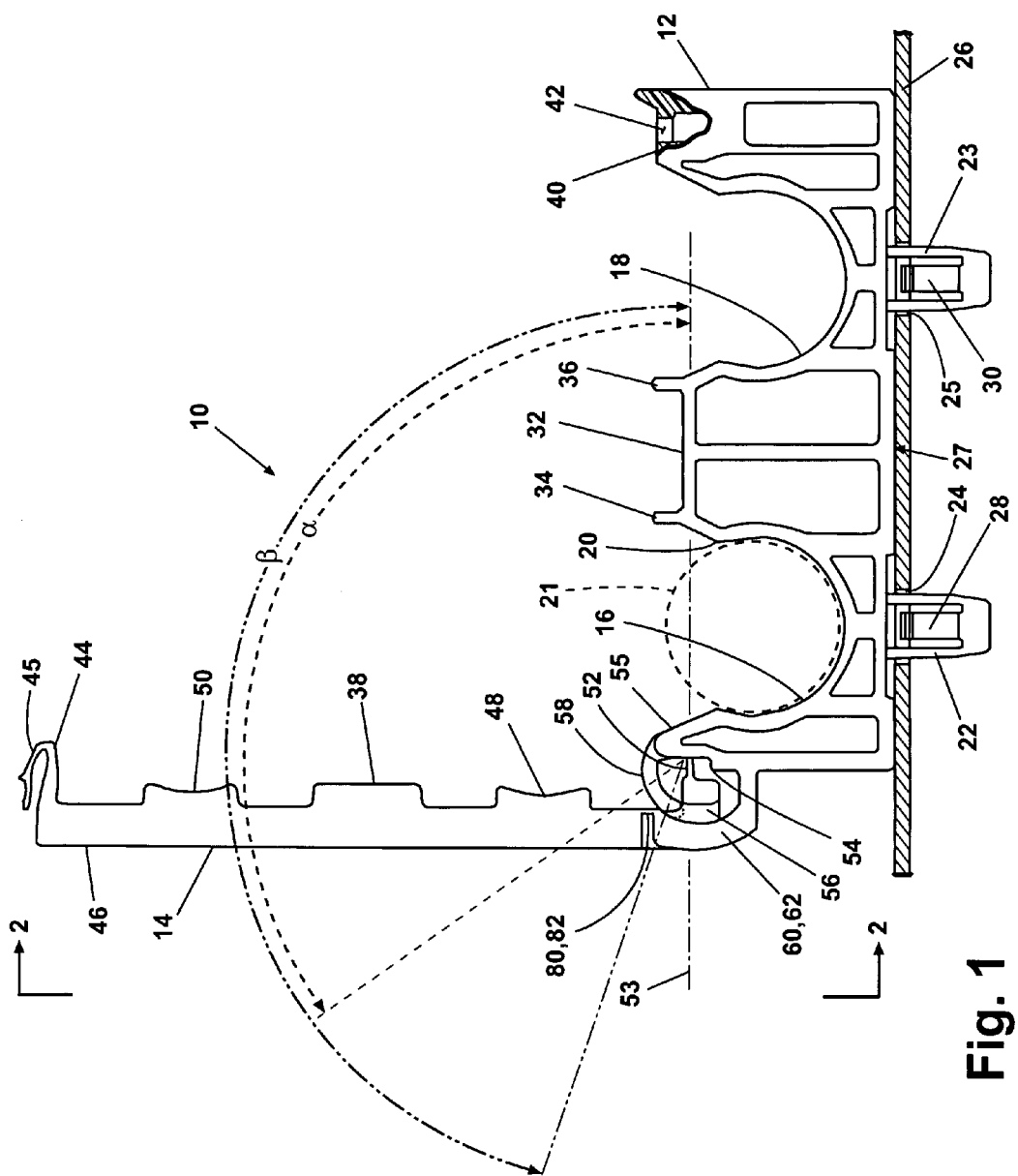
FIG. 1 is a partially cross sectioned side elevational view of a hinged clip having a retainer of the present disclosure.

The following description is merely exemplary in nature and is not intended to limit the present disclosure, application, or uses. It should be understood that throughout the drawings, corresponding reference numerals indicate like or corresponding parts and features.

According to a preferred embodiment of the present disclosure and referring generally to FIG. 1, a clip 10 includes a clip receiving portion 12 and a clip retention portion 14. Clip receiving portion 12 includes a first channel 16 and a second channel 18. Each channel further includes a necked-down region 20. First and second channels 16, 18 are adapted to each receive an elongated element 21 such as a wire, a wiring harness, or a tubular member such as a fuel or break line for an automobile vehicle.

Clip receiving portion 12 further includes a first mounting post 22 and a second mounting post 23 which are slidably received within each of a first receiving aperture 24 and a second receiving aperture 25 of a body member 26 such as a body panel of an automobile vehicle. Each of first and second mounting posts 22, 23 extend through first and second receiving apertures 24, 25 until an engagement surface 27 of clip receiving portion 12 contacts body member 26. At this position, a first deflecting wing 28 of first mounting post 22 and a second deflecting wing 30 of second mounting post 23 deflect outwardly to prevent disengagement of clip receiving portion 12 from body member 26.

Clip receiving portion 12 further includes an abutment face 32 positioned between each of first and second channels 16, 18. A deflectable post 34 and a deflectable post 36 are positioned on either side of abutment face 32 and extend upwardly as viewed in FIG. 1. A projecting member 38 of clip retention portion 14 is engaged between deflectable posts 34, 36 when clip retention portion 14 is rotated from the open position shown to a closed position in contact with clip receiving portion 12. A distal end 40 of clip receiving portion 12 further includes an engagement aperture 42 which receives a hooked engagement device 44 having a deflectable hook member 45 of clip retention portion 14. Hooked engagement device 44 is positioned at a retention portion distal end 46. Deflectable hook member 45 engages within engagement aperture 42 to also assist in retaining clip retention portion 14 in contact with clip receiving portion 12 when clip 10 is in the closed position. Also in the closed position, a first positive engagement member 48 and a second positive engagement member 50 of clip retention portion 14 are positionable proximate to each of first and second channels 16, 18 to further engage each of the elongated elements 21 positioned within first and second channels 16, 18. The rounded concave shape of each of first and second positive engagement members 48, 50 is exemplary of a plurality of shapes that can be used depending upon the geometry of elongated elements 21.

As further shown in FIG. 1, clip 10 includes a living hinge 52 integrally and homogenously joining clip receiving portion 12 to clip retention portion 14. An angle α represents an angular range of rotation for clip retention portion 14 relative to clip receiving portion 12 when living hinge 52 remains intact. Angle α is measurable from a longitudinal axis 53 defining a center line of living hinge 52 and a center line of clip retention portion 14. In the embodiment shown, angle α is at a maximum when a surface 54 of an end wall 55 of clip receiving portion 12 is contacted by a pin member 56 of clip retention portion 14. It will be evident that angle α can range from 0° up to approximately 135°, or greater than approximately 135° depending upon the geometry and clearance provided between surface 54 and pin member 56, as well as a length of living hinge 52.

If living hinge 52 fails for any reason, pin member 56 is retained between a curved retaining element 58 and each of a pair of first and second retaining posts 60, 62 (only first retaining post 60 is visible in this view). Each of curved retaining element 58 and first and second retaining posts 60, 62 are integrally provided with clip receiving portion 12. If living hinge 52 fails, clip receiving portion 12 can rotate relative to clip retention portion 14 up to a maximum rotation angle β. According to one aspect of the disclosure, maximum rotation angle β is at least 180 degrees and can range up to approximately 270 degrees. Maximum rotation angle β is functionally limited only by the geometry of pin member 56 within the channel defined by curved retaining element 58 and each of the pair of first and second retaining posts 60, 62, and can therefore exceed 270 degrees in alternate embodiments of the disclosure. Curved retaining element 58 and first and second retaining posts 60, 62 are capable of retaining pin member 56 for any angle of rotation within the angular range of rotation of angle α and for any angle up to maximum rotation angle β.

Figure 2:
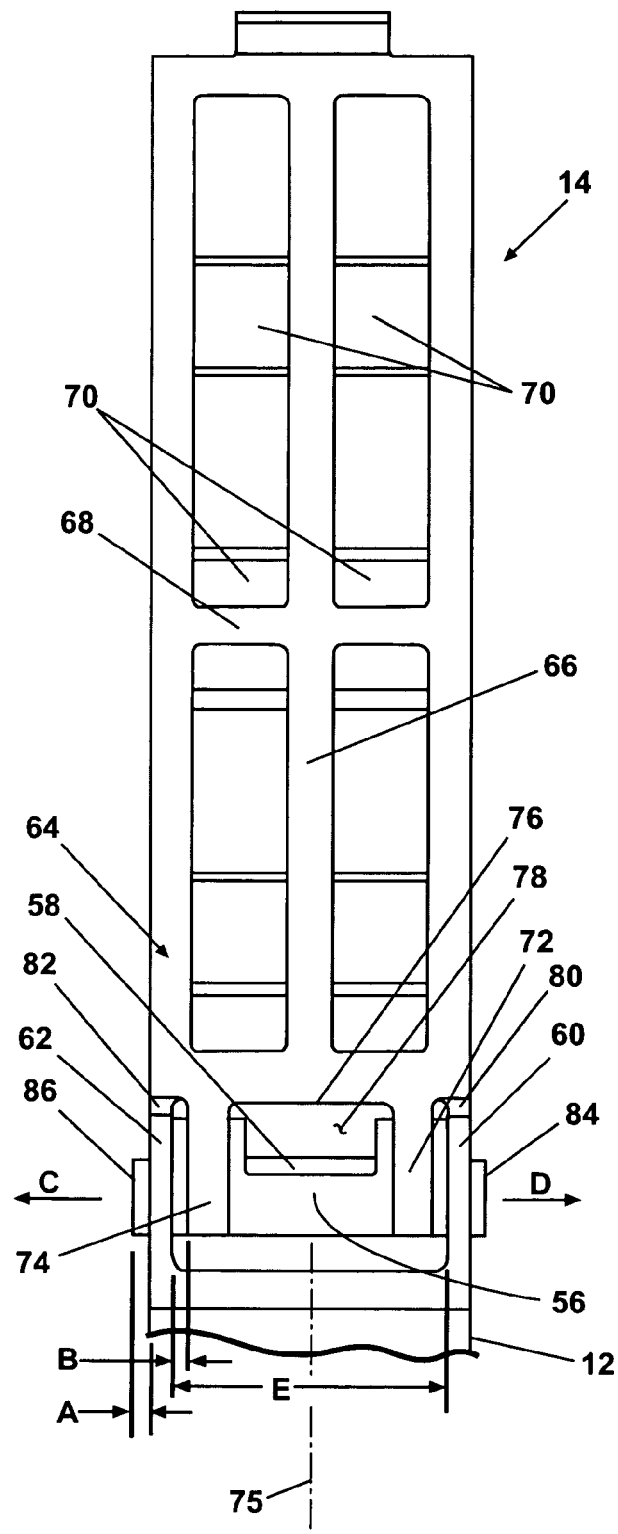
FIG. 2 is an end elevational view taken at section 2 of FIG. 1.

Referring now to FIG. 2, an outer face 64 of clip retention portion 14 includes one or more raised stiles 66 and one or more raised rails 68 created during the forming process which define each of a plurality of partial cavities 70. Partial cavities 70 are provided to eliminate "sink marks" during part cooling and to limit the weight and material costs of clip 10 while stiles 66 and rails 68 provide rigidity for clip retention portion 14. A first connecting column 72 and a second connecting column 74 extend outwardly from a mating end 76 of clip retention portion 14. Pin member 56 is integrally joined to each of first and second connecting columns 72, 74. Pin member 56 is positioned substantially perpendicular to a longitudinal axis 75 of clip retention portion 14. A cavity 78 is created between each of first and second connecting columns 72, 74. Cavity 78 receives curved retaining element 58 of clip receiving portion 12. Pin member 56 is therefore rounded to rotatably and slidably receive curved retaining element 58.

In the as-molded condition of clip 10, clip receiving portion 12 can be further connected to clip retention portion 14 by each of a first frangible element 80 and a second frangible element 82. First frangible element 80 joins a distal end of first retaining post 60 to clip retention portion 14. Similarly, second frangible element 82 connects a distal end of second retaining post 62 to clip retention portion 14. Each of first and second frangible elements 80, 82 are thin walled elements which break when clip retention portion 14 is rotated toward clip receiving portion 12 to close clip 10. First and second frangible elements 80, 82 provide a nominal angle α of approximately 90° which is suitable for automated machinery used to install clip 10. Before first and second frangible elements 80, 82 are broken, a first pin end 84 extends outwardly of first retaining post 60 and a second pin end 86 extends outwardly of second retaining post 62. Each of first and second pin ends 84, 86 extend past their respective retaining post by a dimension "A". Also in this condition, a clearance "B" is provided between each of the first and second retaining posts 60, 62 and the respective one of the first or second connecting column 72, 74. Extension dimension "A" and clearance dimension "B" permit relative displacement between clip receiving portion 12 and clip retention portion 14 in either of directions "C" or "D" after first and second frangible elements 80, 82 and if living hinge 52 are broken. This allows for some degree of alignment to permit curved retaining element 58 to rotatably engage pin member 56 within cavity 78 and provides clearance for the various tooling elements that are used to mold clip 10. A total clearance dimension "E" is provided between first and second retaining posts 60, 62. By maintaining extension dimension "A" at least equal to or greater than each clearance dimension "B", either first or second connecting column 72, 74 will contact first or second retaining posts 60, 62 without losing the retention capability of first or second pin ends 84, 86 with respect to first and second retaining posts 60, 62.

Figure 3:
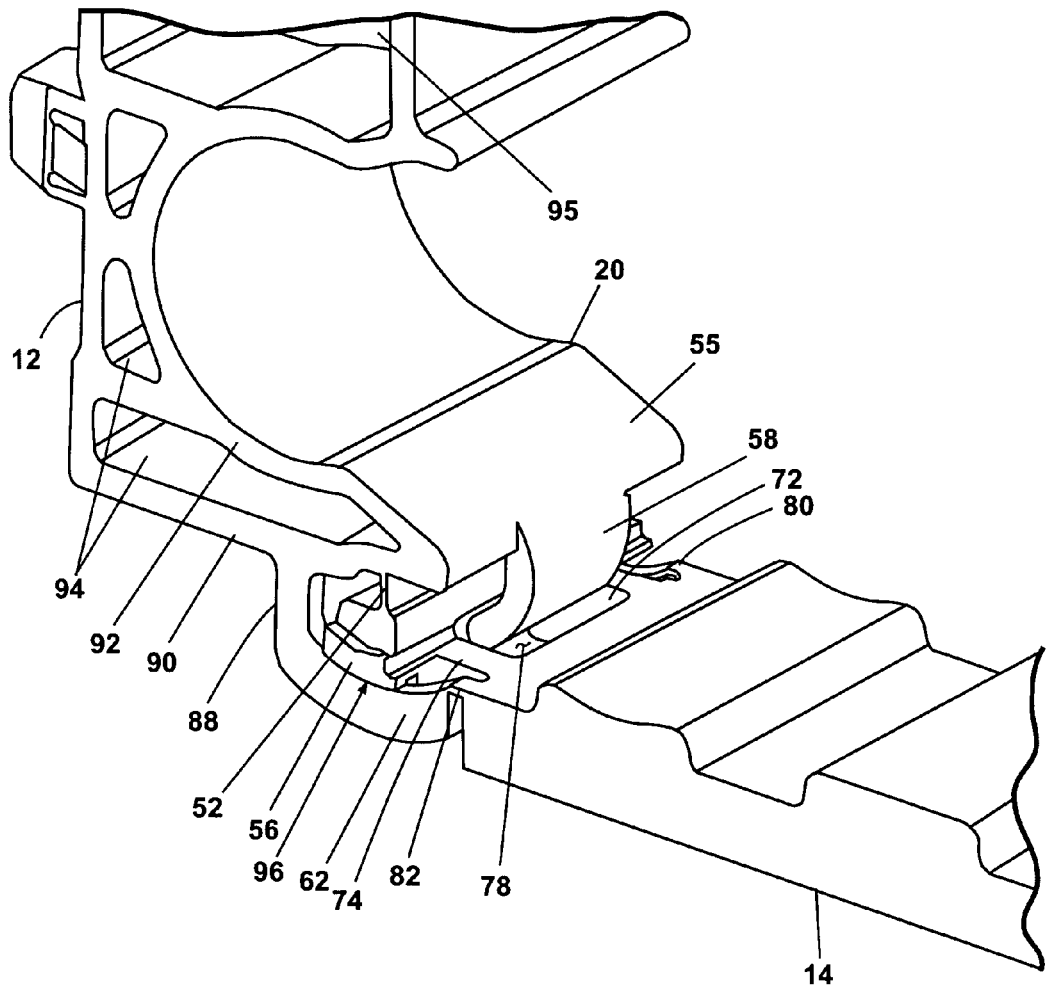
FIG. 3 is a front partial perspective view of the hinge area of the hinged clip of the present disclosure.

As best seen in reference to FIG. 3, curved retaining element 58 extends radially outward from end wall 55. In the as-formed condition shown, a portion of curved retaining element 58 is positioned within cavity 78. A connecting leg 88 integrally joins second retaining post 62 to a member outer wall 90 of clip receiving portion 12. A channel wall 92 of first channel 16 is spatially separated from member outer wall 90 by a plurality of cavities 94. Cavities 94 are provided to eliminate "sink marks", and reduce an overall weight and material costs of clip 10. Each of cavities 94 end approximately at a central location of clip receiving portion 12 at a central wall 95 positioned therein. Pin member 56 is provided with a curved outer face 96 which closely matches a curvature of curved retaining element 58 and a curvature of each of first and second retaining posts 60, 62. After first and second frangible elements 80, 82 break, curved outer face 96 can smoothly contact curved retaining element 58 during rotation of clip retention portion 14 and clip receiving portion 12 about living hinge 52. Because each of first and second retaining posts 60, 62 extend to first and second frangible elements 80, 82 and curved retaining element 58 extends beyond each of first and second connecting columns 72, 74, pin member 56 is enclosed. If living hinge 52 breaks in addition to first and second frangible elements 80, 82, pin member 56 is retained by first and second retaining posts 60, 62 and curved retaining element 58 for any angle α and up to maximum rotation angle β.

Figure 4:
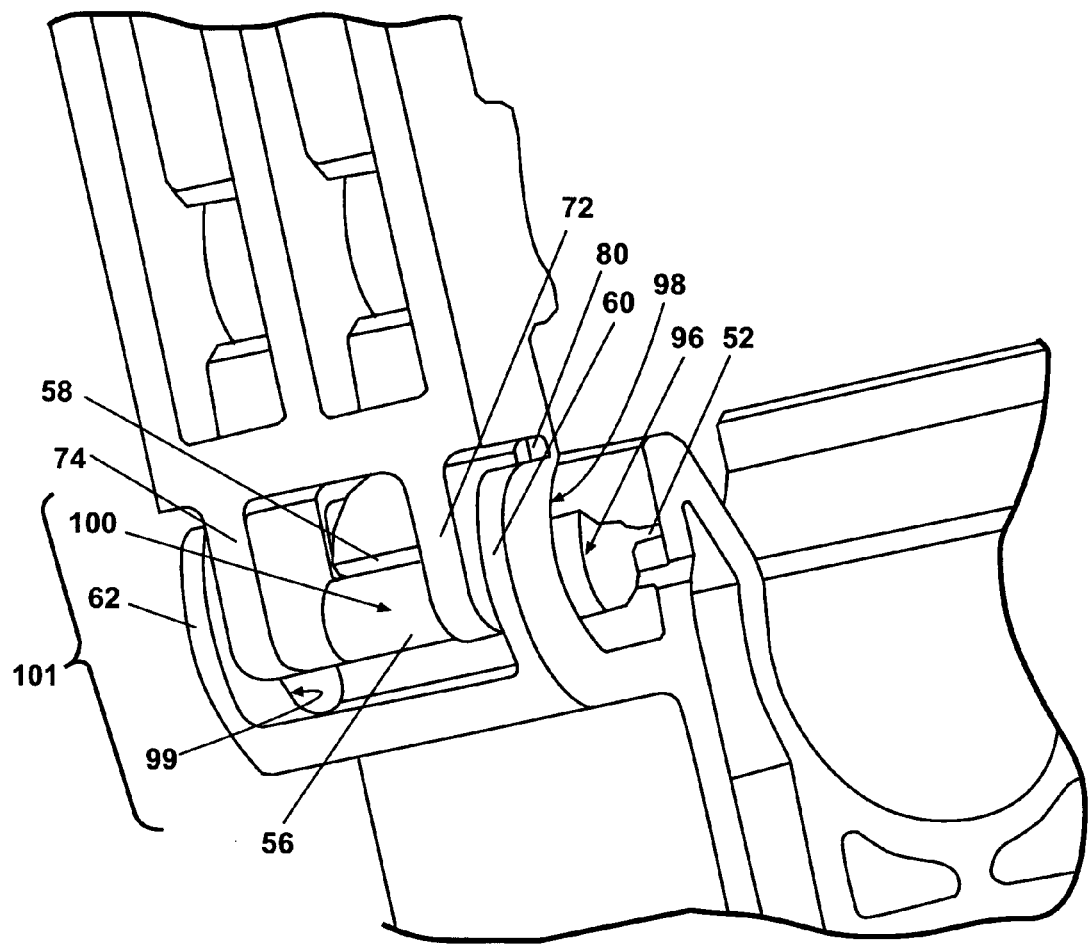
FIG. 4 is a rear partial perspective of the hinge area of the hinged clip of the present disclosure.

Referring now to FIG. 4, curved outer face 96 of pin member 56 is more readily visible with respect to each of a curved post face 98 of first retaining post 60 and a curved post face 99 of second retaining post 62. Pin member 56 also includes a smooth arc surface 100 proximate to a sliding engagement area with curved retaining element 58. A retention device 101 is therefore created from each of the components of pin member 56, curved retaining element 58, first and second connecting columns 72, 74, and first and second retaining posts 60, 62. Retention device 101 functions to prevent disassociation of clip receiving portion 12 from clip retention portion 14 when first and second frangible elements 80, 82 and/or living hinge 52 break.

Figure 5:
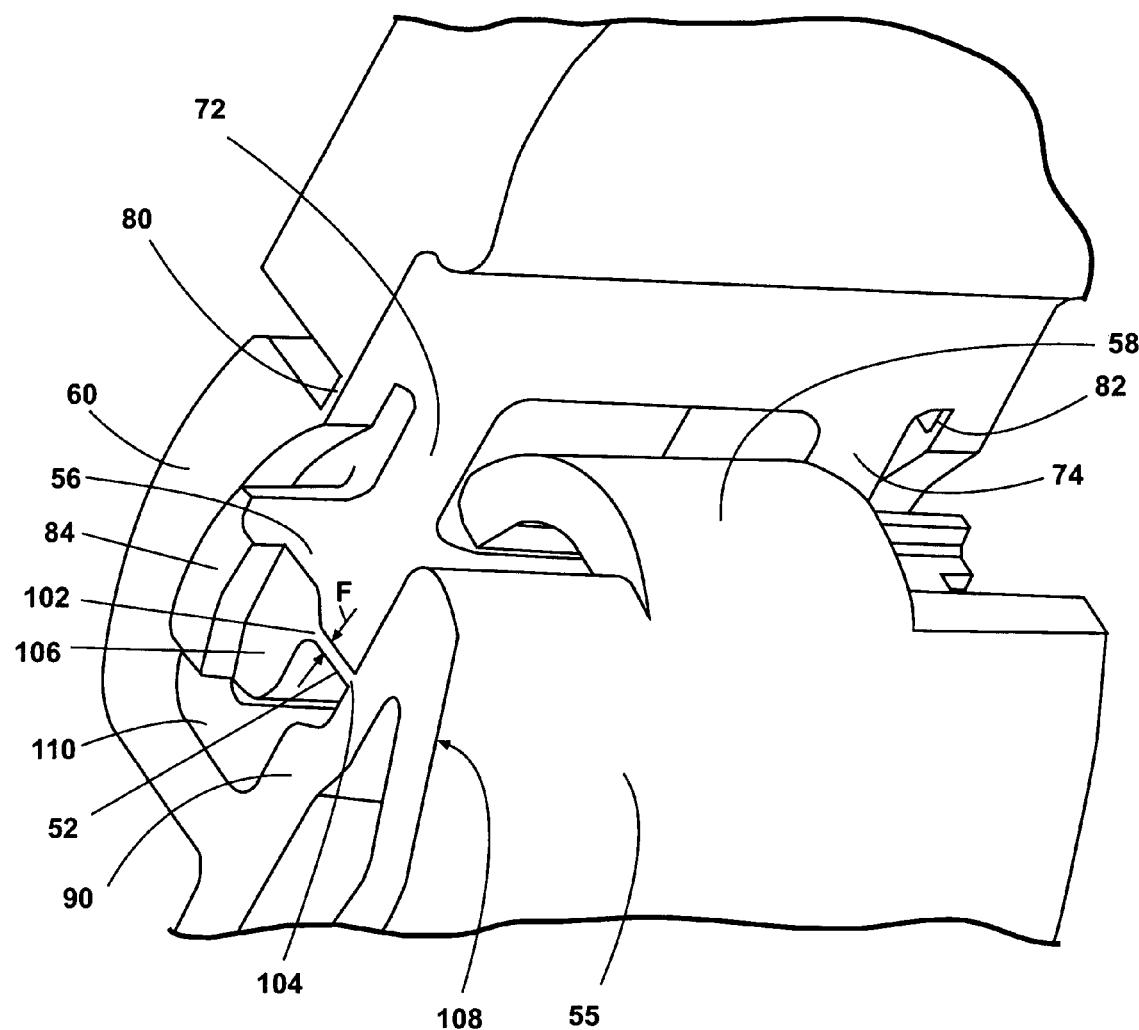
FIG. 5 is a rotated rear partial perspective view of the hinge area of the hinged clip of the present disclosure.

Referring now generally to FIG. 5, living hinge 52 is integrally joined to pin member 56 with a first hinge end 102 and to member outer wall 90 with a second hinge end 104. In the embodiment shown, first hinge end 102 is radiused at its intersection with pin member 56, which provides a greater cross-section of first hinge end 102 compared to second hinge end 104 (which can include a small radii at pin member 56), this greater cross-section is adjustable by the designer to control the rotation point of living hinge 52 between pin member 56 and member outer wall 90. The geometry of living hinge 52 can also be varied from that shown to alter the rotation point of living hinge 52 at the discretion of the designer. To further reduce the overall weight of clip 10, portions of each of first and second pin ends 84, 86 can be eliminated. In the embodiment shown, a flattened face 106 which is substantially coplanar with an edge face 108 of clip receiving portion 12 is recessed from first pin end 84. A similar flattened face is provided proximate to second pin end 86 to reduce the amount of material of first and second pin ends 84, 86. As further evident from FIG. 5, in the event that both first and second frangible elements 80, 82 and living hinge 52 are broken, pin member 56 is retained between curved retaining element 58 and a shelf or bracket 110 positioned substantially perpendicular to member outer wall 90.

Figure 6:
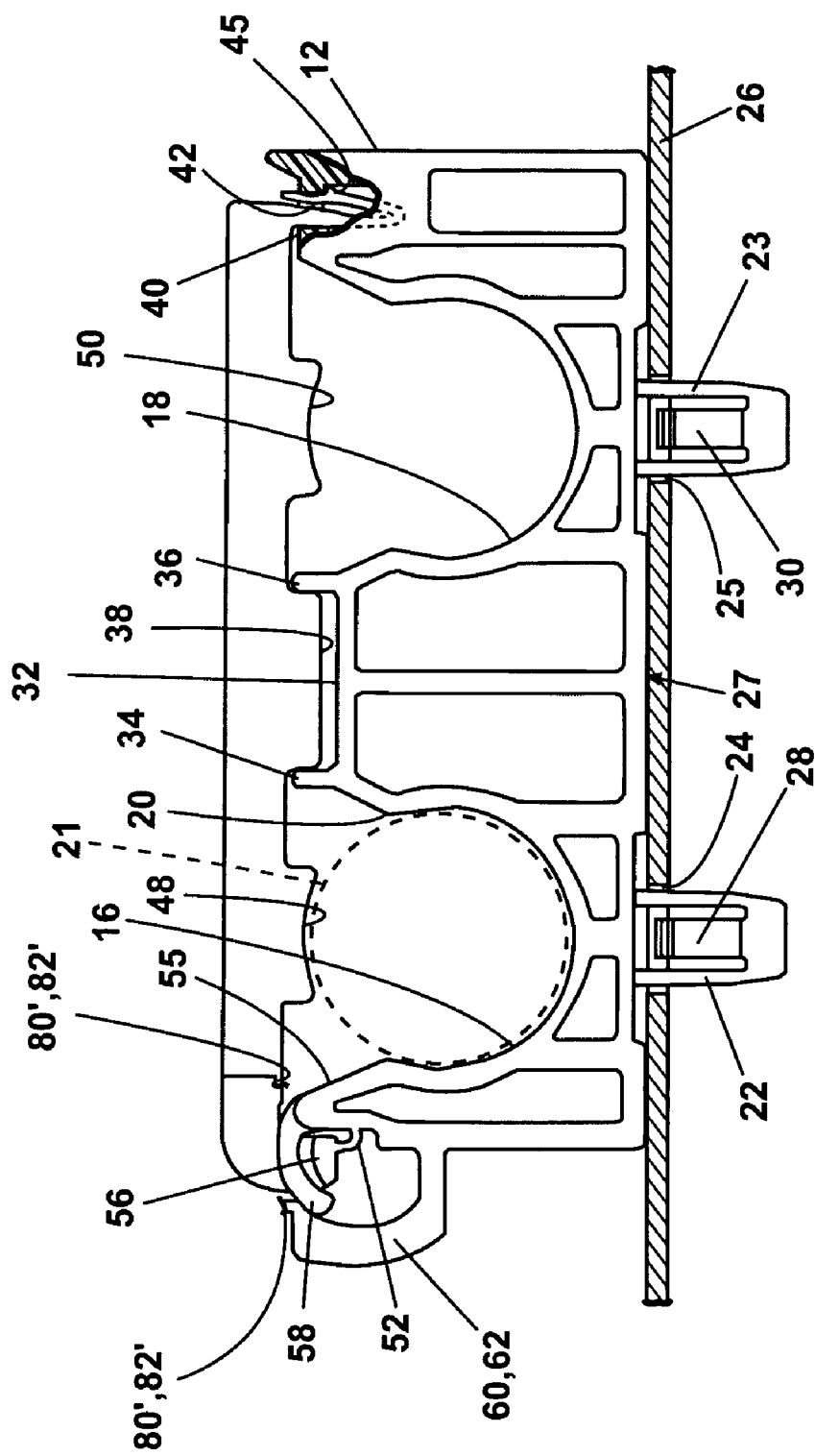
FIG. 6 is a partially cross sectioned side elevational view of a hinged clip of the present disclosure shown in a closed condition.

Referring next to FIG. 6, clip 10 is shown in the closed condition having living hinge 52 still intact. To reach the closed condition, first and second frangible elements 80, 82 (if provided) are broken upon initiation of rotation of clip retention portion 14 relative to clip receiving portion 12. Remaining portions 80',82' of broken first and second frangible elements 80, 82 are shown. Projecting member 38 is frictionally engaged between deflectable posts 34, 36. First and second positive engagement members 48, 50 are operable in the closed condition to engage elongated elements 21. In alternate embodiments, additional projecting member(s) 38 are positionable between any two proximate channels such as first and second channels 16,18 to provide additional engagement force for additional positive engagement members. Deflectable hook member 45 of hooked engagement device 44 latches with a shoulder created in engagement aperture 42. Should living hinge 52 fail in the closed condition, curved outer face 96 of pin member 56 remains in contact with curved retaining element 58 to positively retain elongated elements 21.

According to a preferred embodiment of the present disclosure, clip 10 is preferably formed using an injection molding process using a polymeric material such as Acetal (for example DELRIN® 100P) (polyoxymethylene acetal) available from the DuPont Corporation. In addition to Acetal, nylon material such as ZYTEL® (thermoplastic polyamide) can also be used. A thickness of living hinge 52 can vary from approximately 0.4 mm to approximately 0.55 mm in one aspect of the disclosure, however, the disclosure is not limited to specific dimensions for living hinge 52. In one preferred embodiment of the present disclosure, a quantity of two retaining posts such as first and second retaining posts 60, 62 are provided. The disclosure can also include only one retaining post or more than two retaining posts (not shown). The embodiment shown in FIG. 1 having two channels, i.e. first and second channels 16, 18 is exemplary of a plurality of possible clip embodiments. The quantity of channels can vary from one to greater than 5 at the discretion of the designer. The quantity of mounting posts 22,23 can also be varied from that shown herein. A minimum of zero and a maximum of greater than 2 mounting posts can be used and the mounting post(s) can also be mounted to clip retention portion 14 without departing from the gist of the disclosure. The embodiment of the disclosure depicted in the Figures herein is therefore exemplary of multiple embodiments of the present disclosure which each can benefit from a retention device of the present disclosure. Although the injection molding process is identified for use in a preferred embodiment of the present disclosure, other processes suitable for molding polymeric materials can be used.

Figure 7:
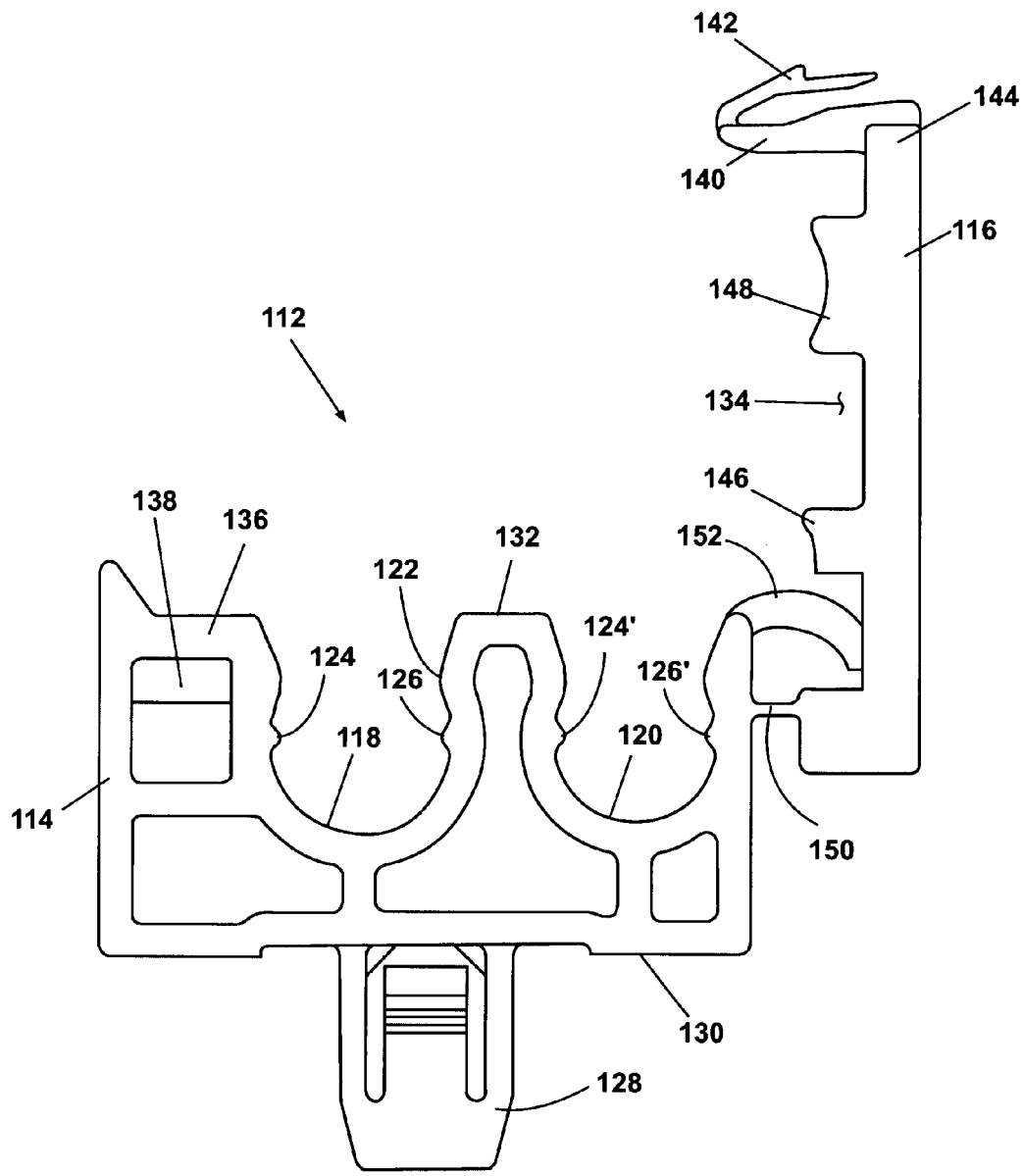
FIG. 7 is a side elevational view of another embodiment of a hinged clip of the present disclosure.

Referring now to FIG. 7, a clip 112 is similar to clip 10 and therefore the differences will be further discussed. Clip 112 can be made from the same materials as clip 10 and also defines a homogenous molded part. Clip 112 includes a clip receiving portion 114 and a clip retention portion 116. Clip receiving portion 114 includes a first channel 118 and a second channel 120. Each channel further includes a necked-down region 122. First and second raised elements 124 (124') and 126 (126') are provided in first and second channels 118, 120 to assist in gripping elongated element 21 (not shown in this view) such as a wire, a wiring harness, or a tubular member such as a fuel or break line for an automobile vehicle. Clip 112 is modified from clip 10 to include only a single mounting post 128 extending from a surface 130 opposed to first and second channels 118, 120. Mounting post 128 is similar in design and function to first and second mounting posts 22, 23 of clip 10.

Clip receiving portion 114 further includes an abutment feature 132 positioned between each of first and second channels 118, 120 which is modified from abutment face 32 of clip 10 by eliminating deflectable posts 34 and 36. A receiving channel 134 of clip retention portion 116 receives abutment feature 132 when clip retention portion 116 is rotated from the open position shown to a closed position in contact with clip receiving portion 114. An engagement end 136 of clip receiving portion 114 is similar to distal end 40 of clip 10 and further includes an engagement aperture 138 which receives a hooked engagement device 140 having a deflectable hook member 142 of clip retention portion 116. Hooked engagement device 144 is positioned at a retention portion distal end 144. Deflectable hook member 142 engages within engagement aperture 138 to also assist in retaining clip retention portion 116 in contact with clip receiving portion 114 when clip 112 is in the closed position. Also in the closed position, a first positive engagement member 146 and a second positive engagement member 148 of clip retention portion 116 are positionable proximate to each of first and second channels 120, 118 respectively to further engage each of the elongated elements positioned within first and second channels 118, 120.

As further shown in FIG. 7, clip 112 includes a living hinge 150 integrally and homogenously joining clip receiving portion 114 to clip retention portion 116. A curved retaining element 152 is provided similar to curved retaining element 58 of clip 10. Clip 112 is further modified from clip 10 by eliminating the pair of first and second retaining posts 60, 62 and first and second frangible elements 80, 82.

Application of clips 10 and 112 of the present disclosure is also not limited to the examples given herein. For example, clips 10 and 112 can be used in addition to automotive applications in multiple applications including but not limited to aircraft, ships, trains, computer systems, etc. The shape of first and second channels 16, 18 is not limited to the generally circular shape described herein. Other shapes such as rectangular, oval, triangular, etc. can also be used. The embodiment shown herein having an angle α of approximately 90° for the as-formed condition is particularly beneficial for applications where automated machinery is used to install clips 10 or 112. This angle can also be varied at the discretion of the designer depending upon the intended application, the type of automated installation equipment used, or if manual assembly of clip 10 is anticipated. Angle α and maximum rotation angle β can also be controlled at the discretion of the designer for a specific application of clips 10 or 112 by varying the geometry of the various components of retention device 101.

A hinged clip having a retainer of the present disclosure offers several advantages. The retainer of the present disclosure is functional for any orientation of the first and second clip members. The retainer is therefore functional to provide for engagement of the two clip members even if the living hinge fails during shipment or before installation of the clip as well as after installation. The retainer of the present disclosure also maintains the necessary clamping force between the two clip members and the elongated article(s) if the living hinge fails after the clip is installed. The hinged clip of the present disclosure also accommodates installation tolerances of the elongated articles.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A hinged clip retention system, comprising:
   first and second clip portions;
   a living hinge integrally connecting the first clip portion to the second clip portion and operable to permit rotation of the first and second clip portions relative to each other for a plurality of rotation angles within a predefined angular range of rotation between a clip closed condition and a clip open condition;
   a retention device operable upon failure of the living hinge to prevent disassociation of the first and second clip portions in the clip open condition and for any rotation angle within the predefined angular range of rotation of the living hinge, wherein the retention device further includes:
   a first end of the first clip portion;
   a pin element integrally extending from the first end of the first clip portion operable to integrally receive a first portion of the living hinge;
   a mating end of the second clip portion integrally connectable to a second portion of the living hinge; and
   a spaced pair of curved elements extending from the mating end operable to partially enclose the pin element, wherein the pin element is rotationally retained by the curved elements upon failure of the living hinge; and
   a male engagement element radially extending from the mating end and positioned between and facing substantially toward the pair of curved elements;
   wherein the male engagement element is operable to partially enclose the pin element between the pair of curved elements; and
   wherein each of the first and second clip portions and the living hinge are a polymeric material.

2. A hinged clip retention system, comprising:
   first and second clip portions;
   a living hinge integrally connecting the first clip portion to the second clip portion and operable to permit rotation of the first and second clip portions relative to each other having a rotation angle within an angular range of rotation;
a retention device operable to connect the first and second clip portions, the retention device upon failure of the living hinge being operable to prevent disassociation of the first and second clip portions for the rotation angle within the angular range of rotation of the living hinge and up to a maximum rotation angle;
at least two substantially U-shaped channels created in one of the first and second clip portions each operable to receive an elongated element;
a spaced pair of deflectable posts both positioned between the U-shaped channels; and
a male projecting member integrally extending from the other one of the first and second clip portions and positioned to be matingly received between the spaced pair of deflectable posts in a closed condition of the first and second clip portions.

3. A hinged clip retention system, comprising:
a first body member;
a second body member integrally connectable to the first body member;
a connection joint operable to connect the second body member to the first body member, the connection joint including:
a pin integrally connected to the first body member; and
a living hinge integrally connecting the pin to the second body member, the living hinge being operable to permit rotation of the first and second body members relative to each other having a rotation angle within an angular range of rotation;
at least one curved element integrally connected to the second body member and operable to partially enclose the pin, the curved element upon failure of the living hinge being operable to prevent separation of the first and second clip members for the rotation angle within the angular range of rotation of the living hinge and up to a maximum rotation angle; and
an arc-shaped member extendable from the second body member and oppositely positioned from the curved element, the arc-shaped member operable to further enclose the pin.

4. The retention system of claim 3, wherein the at least one curved element further comprises a spaced pair of curved elements defining a cavity having the pin positioned substantially within the cavity.

5. The retention system of claim 4, wherein the pin further comprises an opposed pair of extending ends, each of the extending ends extending outside of the cavity and beyond a proximate one of the curved elements.

6. The retention system of claim 5, further comprising:
a pair of connecting legs extending from the first body member operable to integrally connect the pin to the first body member;
wherein the pair of connecting legs define a cavity between the connecting legs operable to receive the arc-shaped member.

7. The retention system of claim 6, wherein each of the curved elements is positioned proximate to one of the connecting legs and externally positioned relative to the connecting legs.

8. The retention system of claim 4, further comprising:
a curved outer surface of the pin; and
a curved face of each of the curved elements adapted to rotatably receive the curved outer surface of the pin upon failure of the living hinge.

9. A retention system for a hinged clip, comprising:
a first body member having at least one U-shaped channel operable to receive a longitudinally extending item;
a second body member having a male extending hook member operable to engage the second body member to the first body member; and
a connection joint operable to connect the second body member to the first body member, including:
a living hinge operable to rotatably connect the first body member to the second body member having a rotation angle within an angular range of rotation;
at least one retention element extendable from the second body member proximate to the living hinge and operable to prevent disassociation of the first and second body members if the living hinge fails for any angular rotation of the first and second body members relative to each other for the rotation angle within the angular range of rotation of the living hinge and up to a maximum rotation angle, the at least one retention element further including a pair of spatially separated curved elements extending from a first end of the second body member operable to partially enclose a pin element;
the pin element integrally extending from a first end of the first body member and oriented substantially parallel to the living hinge;
a bracket extending substantially perpendicular to the second body member, the bracket integrally connecting each of the pair of curved elements to the second body member;
wherein the bracket and the pair of curved elements operably define a channel having the pin element disposed substantially within the channel.

10. The retention system of claim 9, further comprising:
a male engagement element defining an arc extending from the second body member positioned between and substantially toward the pair of curved elements;
wherein the male engagement element is operable to partially enclose the pin element between the pair of curved elements.

11. A method for preventing disassociation of a first member of a clip having a pin from a second member of the clip normally joined by a living hinge upon failure of the living hinge, the living hinge operable to provide an angular range of rotation between the first and second members, the method comprising:
integrally connecting the pin to the first clip member;
integrally coupling the pin to the second clip member with the living hinge operable to allow the first and second clip members to rotate between a clip closed position and a clip open position;
homogenously joining oppositely directed extension members with the second clip member operable to at least partially enclose the pin;
rotatably engaging the oppositely directed extension members with the pin to operably prevent disassociation of the first and second clip members upon failure of the living hinge in the clip open position and for a plurality of angles of rotation between the first and second body members within a predetermined angular range of rotation defined from the clip closed position and the clip open position and up to a maximum angle of rotation greater than any of the plurality of angles of rotation; and positioning the oppositely directed extension members having a first one of the extension members located between and oppositely directed with respect to a second one and a third one of the extension members.

12. The method of claim 11, further comprising:
joining the pin to the first member with a pair of columns; and
positioning the first one of the extension members between the pair of columns.

13. The method of claim 12, further comprising positioning the pair of columns between the second and third ones of the extension members.

14. The method of claim 11, further comprising extending opposed portions of the pin each beyond one of the second and third ones of the extension members.

15. The method of claim 11, further comprising integrally connecting each of the second and third ones of the extension members to the first member with a frangible element functional to provide an as-molded orientation of the first and second members relative to each other.

16. The method of claim 11, further comprising extending a male hook-shaped engagement member from a distal end of the second member.

17. The method of claim 16, further comprising engaging the male hook-shaped engagement member in a receiving aperture of the first member to operably latch the clip in a closed condition.

18. The method of claim 11, further comprising injection molding the clip of a nylon material.

19. The method of claim 11, further comprising forming at least a portion of the pin in a substantially arc shape.

* * * * *